US012169380B2

(12) United States Patent
Shuin et al.

(10) Patent No.: US 12,169,380 B2
(45) Date of Patent: Dec. 17, 2024

(54) DISCHARGE DEVICE AND IMAGE FORMING APPARATUS

(71) Applicant: FUJIFILM Business Innovation Corp., Tokyo (JP)

(72) Inventors: Yoshinori Shuin, Kanagawa (JP); Takahiro Iizuka, Kanagawa (JP); Kohei Takahashi, Kanagawa (JP); Mai Yamazaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 17/894,138

(22) Filed: Aug. 23, 2022

(65) Prior Publication Data

US 2023/0305475 A1 Sep. 28, 2023

(30) Foreign Application Priority Data

Mar. 22, 2022 (JP) ................................. 2022-045784

(51) Int. Cl.
*B65H 31/02* (2006.01)
*B41J 11/00* (2006.01)
(Continued)

(52) U.S. Cl.
CPC ........ *G03G 15/6552* (2013.01); *B41J 11/007* (2013.01); *B41J 13/106* (2013.01); *B65H 31/00* (2013.01); *B65H 29/00* (2013.01)

(58) Field of Classification Search
CPC ........ B65H 31/02; B65H 31/20; B65H 31/24; B65H 2405/1111; B65H 2405/11151;
(Continued)

(56) References Cited

U.S. PATENT DOCUMENTS 7,850,168 B2 * 12/2010 Shinkawa .............. B65H 31/02 271/223
8,045,914 B2 10/2011 Kato et al.
(Continued)

FOREIGN PATENT DOCUMENTS

JP 2007248765 9/2007

*Primary Examiner* — Luis A Gonzalez
(74) *Attorney, Agent, or Firm* — JCIPRNET

(57) ABSTRACT

A discharge device includes a placement part on which a medium discharged from an apparatus body is placed and from which the medium is returned to the apparatus body, a loading part which is disposed on a lower side of the placement part to have a space between the loading part and the placement part and on which the medium discharged to the space from the apparatus body in a predetermined discharge direction is loaded, a support portion that is provided on the loading part to protrude toward an upper side of the loading part, includes an inclined surface having an upward gradient toward a downstream side in the discharge direction, and supports the medium which is loaded on the loading part at an upper end of the inclined surface, and an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part; and an angle of a loading surface of the opening/closing part at the open position with respect to a horizontal is set to an angle at which a movement of the medium to the downstream side in the discharge direction is limited such that a centroid of a longest medium loaded on the loading part and the loading surface is positioned upstream of a downstream end of the opening/closing part in the discharge direction, and an imaginary line extending to
(Continued)

the upper end from an upstream end of the inclined surface of the support portion in the discharge direction is along the loading surface of the opening/closing part at the open position.

20 Claims, 5 Drawing Sheets

(51) Int. Cl.

| | |
|---|---|
| ***B41J 13/10*** | (2006.01) |
| ***B65H 31/00*** | (2006.01) |
| ***B65H 31/20*** | (2006.01) |
| ***G03G 15/00*** | (2006.01) |
| *B65H 29/00* | (2006.01) |

(58) Field of Classification Search
CPC .. B65H 2405/1116; B65H 2405/11164; B65H 2405/1117; B65H 2405/1412; G03G 15/6552; B41J 13/106
See application file for complete search history.

(56) References Cited

U.S. PATENT DOCUMENTS

| | | | | |
|---|---|---|---|---|
| 2006/0017219 | A1* | 1/2006 | Yamada | B65H 31/02 271/209 |
| 2012/0061902 | A1* | 3/2012 | Ino | B65H 31/26 271/265.01 |
| 2016/0154358 | A1* | 6/2016 | Hashimoto | B65H 31/20 271/213 |

* cited by examiner

DISCHARGE DEVICE AND IMAGE FORMING APPARATUS

CROSS-REFERENCE TO RELATED APPLICATIONS

This application is based on and claims priority under 35 USC 119 from Japanese Patent Application No. 2022-045784 filed Mar. 22, 2022.

BACKGROUND

(i) Technical Field

The present invention relates to a discharge device and an image forming apparatus.

(ii) Related Art

JP2007-248765A discloses an image forming apparatus including image forming means that is provided with image exposure means and an image carrier, transfer means that transfers toner images formed on the image carrier by the image forming means to a transfer material, fixing means that fixes the toner images to the transfer material, a transport path along which the transfer material is transported to a sheet discharge/loading part and/or an inverting part, sheet discharge means that discharges the transfer material to the sheet discharge/loading part, and inverting means that inverts the transfer material transported to the inverting part. The image forming apparatus further includes cooling means that cools the sheet discharge/loading part, and the inverting part is provided on the upper side of the sheet discharge/loading part.

SUMMARY

A discharge device including: a placement part on which a medium discharged from an apparatus body is placed and from which the medium is returned to the apparatus body; and a loading part which is disposed on a lower side of the placement part to have a space between the loading part and the placement part and on which the medium discharged to the space from the apparatus body in a predetermined discharge direction is loaded is conceivable as a discharge device from which a medium is discharged.

A discharge device further including: a support portion that is provided on the loading part to protrude toward an upper side of the loading part, includes an inclined surface having an upward gradient toward a downstream side in the discharge direction, and supports the medium which is loaded on the loading part at an upper end of the inclined surface; and an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part is conceivable as the discharge device.

Here, in a case where the angle of an imaginary line, which extends to the upper end from an upstream end of the inclined surface of the support portion in the discharge direction, with respect to a horizontal is small, the movement of the medium, which is discharged to the space, to the downstream side in the discharge direction is not limited and the medium may fall from the opening/closing part.

Aspects of non-limiting embodiments of the present disclosure relate to a discharge device and an image forming apparatus in which the falling of a medium from an opening/closing part is suppressed as compared to a case where an imaginary line is along a surface of which an angle with respect to a horizontal is smaller than an angle of a loading surface of the opening/closing part at an open position with respect to the horizontal.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a discharge device including: a placement part on which a medium discharged from an apparatus body is placed and from which the medium is returned to the apparatus body; a loading part which is disposed on a lower side of the placement part to have a space between the loading part and the placement part and on which the medium discharged to the space from the apparatus body in a predetermined discharge direction is loaded; a support portion that is provided on the loading part to protrude toward an upper side of the loading part, includes an inclined surface having an upward gradient toward a downstream side in the discharge direction, and supports the medium which is loaded on the loading part at an upper end of the inclined surface; and an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part. An angle of a loading surface of the opening/closing part at the open position with respect to a horizontal is set to an angle at which a movement of the medium to the downstream side in the discharge direction is limited such that a centroid of a longest medium loaded on the loading part and the loading surface is positioned upstream of a downstream end of the opening/closing part in the discharge direction, and an imaginary line extending to the upper end from an upstream end of the inclined surface of the support portion in the discharge direction is along the loading surface of the opening/closing part at the open position.

BRIEF DESCRIPTION OF THE DRAWINGS

Exemplary embodiment(s) of the present invention will be described in detail based on the following figures, wherein.

DETAILED DESCRIPTION

Examples of exemplary embodiments of the present invention will be described below with reference to the drawings.

Image Forming Apparatus 10

Figure 1:
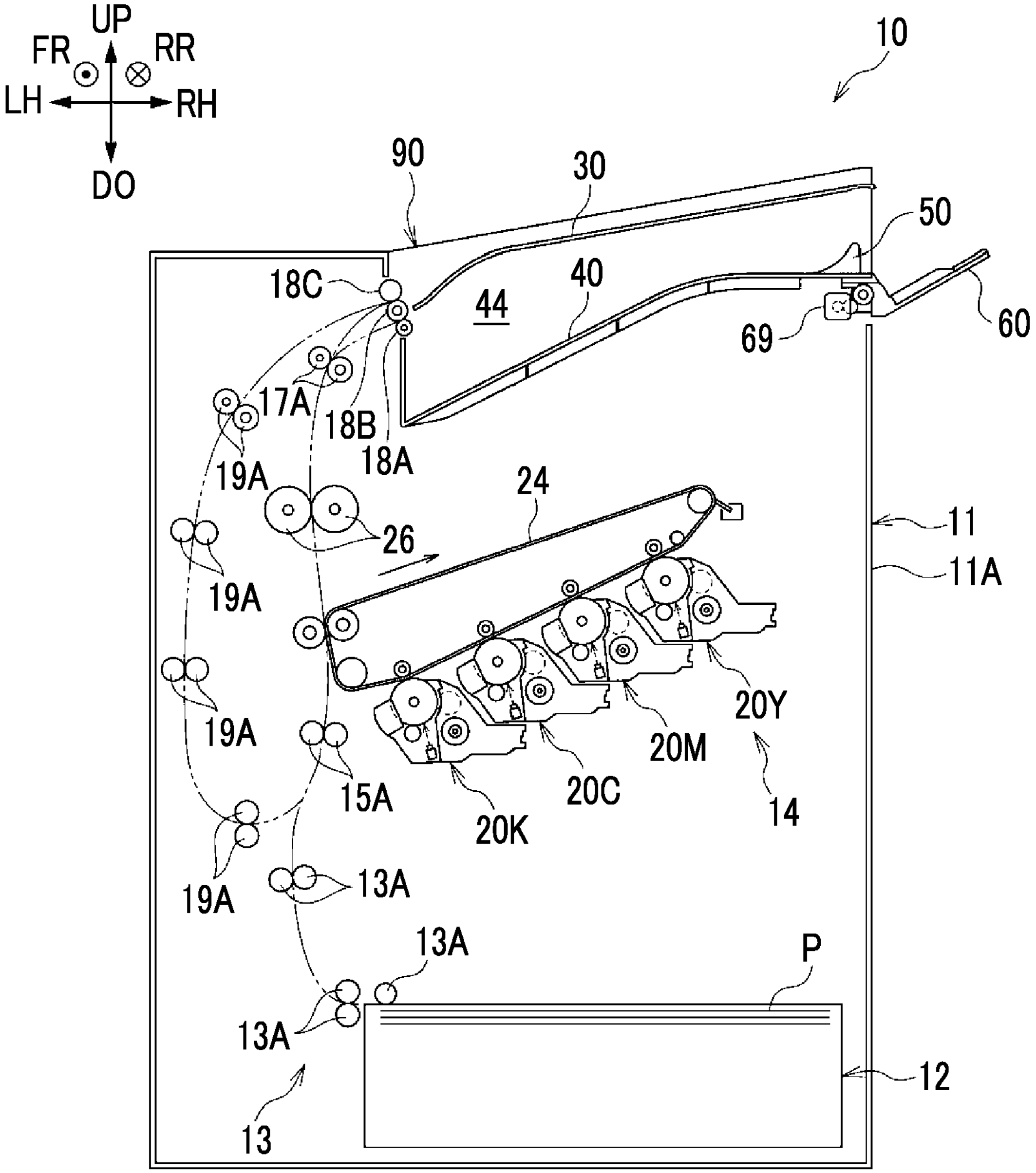
FIG. 1 is a schematic diagram showing an image forming apparatus according to an exemplary embodiment.

The configuration of an image forming apparatus 10 according to this exemplary embodiment will be described. FIG. 1 is a schematic diagram showing the configuration of the image forming apparatus 10 according to this exemplary embodiment.

An arrow UP shown in the drawings indicates the upper side of the apparatus (specifically, a vertical upper side) and an arrow DO indicates the lower side of the apparatus (specifically, a vertical lower side). Further, an arrow LH shown in the drawings indicates the left side of the apparatus and an arrow RH indicates the right side of the apparatus. Furthermore, an arrow FR shown in the drawings indicates the front side of the apparatus and an arrow RR indicates the rear side of the apparatus. Since these directions are directions defined for the convenience of description, the configuration of the apparatus is not limited to these directions. The word "apparatus" may be omitted in each direction of the apparatus. That is, for example, "the upper side of the apparatus" may be simply referred to as "the upper side".

Further, in the following description, "up-down direction" may be used to mean "both an upper side and a lower side" or "any one of the upper side or the lower side". "Left-right direction" may be used to mean "both a left side and a right side" or "any one of the left side or the right side". "Left-right direction" may be also referred to as a lateral side, a lateral direction, and a horizontal direction. "Front-rear direction" may be used to mean "both a front side and a rear side" or "any one of the front side or the rear side". "Front-rear direction" may be also referred to as a lateral side, a lateral direction, and a horizontal direction. Furthermore, the up-down direction, the left-right direction, and the front-rear direction are directions intersecting with each other (specifically, directions orthogonal to each other).

Further, a symbol in which "×" is written in "○" in the drawings means an arrow from the front to the back of the plane of the paper. Furthermore, a symbol in which "•" is written in "○" in the drawings means an arrow from the back to the front of the plane of the paper.

The image forming apparatus 10 shown in FIG. 1 is an apparatus for forming an image. Specifically, as shown in FIG. 1, the image forming apparatus 10 includes an image forming apparatus body 11, a storage unit 12, a transport unit 13, an image forming unit 14, and a discharge device 90. Each part of the image forming apparatus 10 will be described below.

Image Forming Apparatus Body 11

The image forming apparatus body 11 shown in FIG. 1 is an example of an apparatus body, and is a part in which each component of the image forming apparatus 10 is provided. Specifically, the image forming apparatus body 11 includes a housing 11A that houses each component of the image forming apparatus 10.

In this exemplary embodiment, the storage unit 12, the transport unit 13, and the image forming unit 14 are disposed in the image forming apparatus body 11 (specifically, the housing 11A). Further, the discharge device 90 is provided on the upper side of the image forming apparatus body 11 (specifically, the housing 11A).

Storage Unit 12

The storage unit 12 is a part that stores recording mediums P in the image forming apparatus 10. The recording mediums P stored in the storage unit 12 are supplied to the image forming unit 14. The recording medium P stored in the storage unit 12 is an example of a medium and is an object on which images are to be formed by the image forming unit 14. Examples of the recording medium P include a sheet, a film, and the like. Examples of the film include a resin film, a metal film, and the like. The recording medium P is not limited to the above-mentioned mediums and various recording mediums can be used.

Transport Unit 13

The transport unit 13 is a component that transports the recording medium P in the image forming apparatus 10. Specifically, the transport unit 13 has a function to transport the recording medium P stored in the storage unit 12 to the image forming unit 14, a function to transport a recording medium P on which images are formed by the image forming unit 14 to a loading part 40 to be described later of the discharge device 90, and a function to invert a recording medium P on which images are formed on one surface by the image forming unit 14 and to transport the recording medium P to the image forming unit 14 again.

The transport unit 13 includes transport members 13A, 15A, 17A, 18A, 18B, 18C, and 19A that are formed of a plurality of transport rollers or the like. In the transport unit 13, the transport members 13A and 15A transport the recording mediums P stored in the storage unit 12 to the image forming unit 14.

Further, in the transport unit 13, the transport members 17A, 18B, 18C, 19A, and 15A invert a recording medium P on which images are formed on one surface by the image forming unit 14 and transport the recording medium P to the image forming unit 14 again. In this case, the transport unit 13 discharges the recording medium P from the image forming apparatus body 11 to a placement part 30 to be described later of the discharge device 90 to place the recording medium P on the placement part 30 by the transport member 18B, which rotates in a reverse direction (specifically, rotates in a clockwise direction in FIG. 1), and the transport member 18C and then returns the recording medium P to the image forming apparatus body 11 by the transport member 18B, which rotates in a normal direction, and the transport member 18C. After that, the transport members 19A and 15A transport the recording medium P, which is returned to the image forming apparatus body 11, to the image forming unit 14. Accordingly, the recording medium P is inverted upside down and is transported to the image forming unit 14.

Furthermore, in the transport unit 13, the transport members 17A, 18A, and 18B transport the recording medium P on which the images are formed by the image forming unit 14 to the loading part 40 to be described later of the discharge device 90. In this case, the transport unit 13 discharges the recording medium P from the inside of the image forming apparatus body 11 to the loading part 40 to be described later of the discharge device 90 by the transport member 18B, which rotates in a normal direction (specifically, rotates in a counterclockwise direction in FIG. 1), and the transport member 18A.

Image Forming Unit 14

The image forming unit 14 shown in FIG. 1 has a function to form an image on the recording medium P. Specifically, the image forming unit 14 forms toner images (an example of an image) on the recording medium P, which is transported by the transport unit 13 (specifically, the transport members 13A and 15A, and the like), by an electrophotographic method. More specifically, as shown in FIG. 1, the image forming unit 14 includes toner image forming units 20Y, 20M, 20C, and 20K (hereinafter, referred to as 20Y to 20K), a transfer body 24, and a fixing unit 26.

In the image forming unit 14, the respective toner image forming units 20Y to 20K perform the respective steps, such as charging, exposure, development, and transfer, to form toner images having the respective colors, such as yellow (Y), magenta (M), cyan (C), and black (K), on the transfer body 24. Furthermore, the image forming unit 14 transfers the toner images having the respective colors, which are formed on the transfer body 24, to the recording medium P and fixes the toner images to the recording medium P by the fixing unit 26. The image forming unit 14 uses an intermediate transfer method of transferring an image to the recording medium P via the transfer body 24 in this way.

Discharge Device 90

The discharge device 90 shown in FIG. 1 is a device to which a recording medium P is to be discharged from the image forming apparatus body 11. The discharge device 90 forms the upper portion of the image forming apparatus 10. Specifically, the discharge device 90 is disposed on the upper side of the image forming apparatus body 11 (housing 11A).

Figure 2:
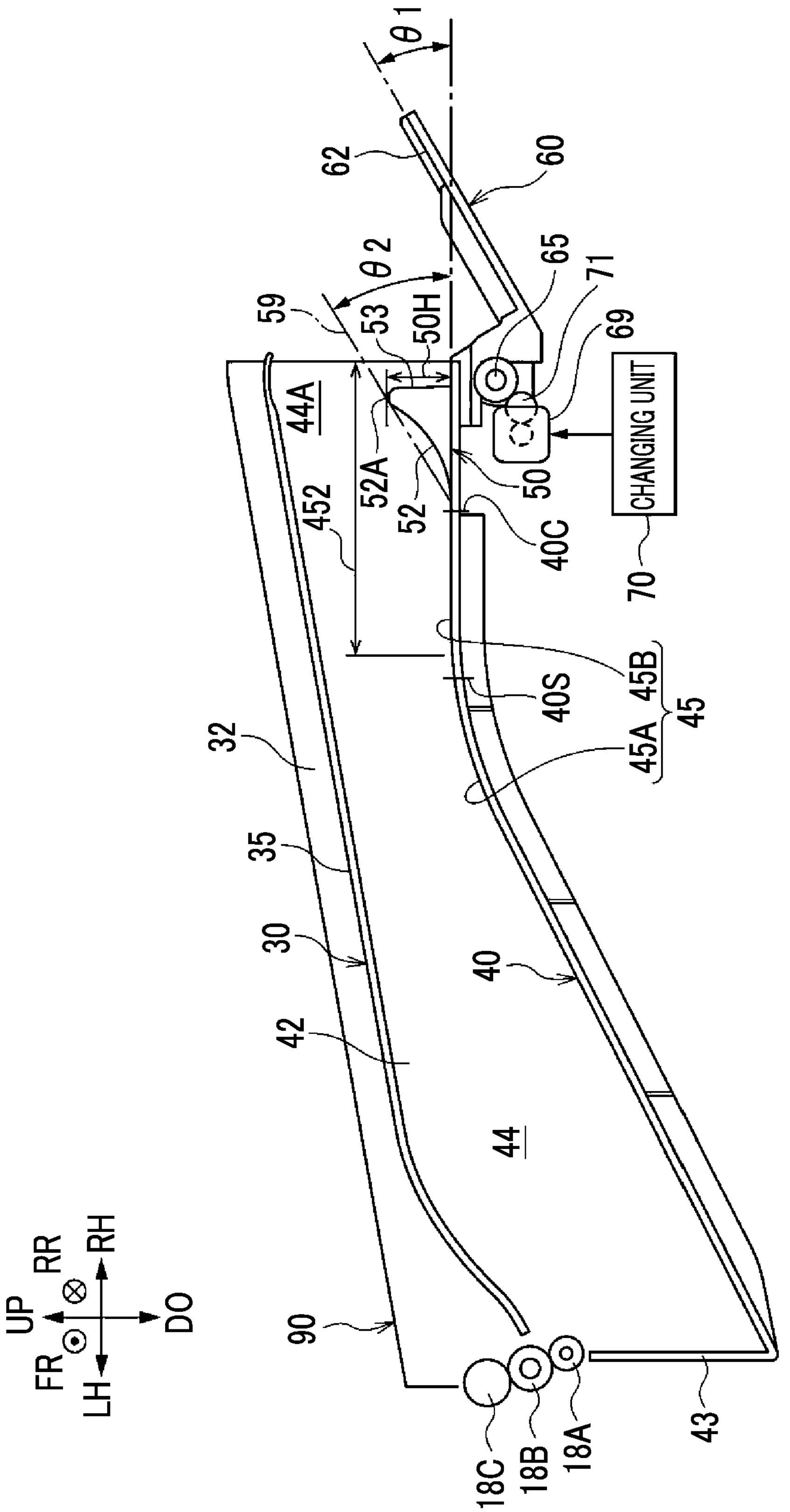
FIG. 2 is a schematic diagram showing a discharge device according to this exemplary embodiment.

As shown in FIGS. 1 and 2, the discharge device 90 includes a placement part 30, a loading part 40, a support portion 50, an opening/closing part 60, a drive source 69, and a changing unit 70 (see FIG. 2). In the discharge device 90, the recording medium P on which the images are formed by the image forming unit 14 is loaded on the loading part 40. In a case where images are to be formed on both surfaces of the recording medium P, a recording medium P on which toner images are formed on one surface by the image forming unit 14 is placed on the placement part 30 and is inverted and a recording medium P on which toner images are formed on the other surface by the image forming unit 14 is loaded on the loading part 40. Each part of the discharge device 90 will be described below.

Placement Part 30

The placement part 30 shown in FIG. 1 is a component on which the recording medium P discharged from the image forming apparatus body 11 is placed and from which the recording medium P is then returned to the image forming apparatus body 11. As shown in FIG. 1, the placement part 30 forms the upper portion of the discharge device 90. The placement part 30 is disposed on the upper side of the image forming apparatus body 11 (housing 11A) at a position away from the image forming apparatus body 11 (housing 11A).

The placement part 30 is formed of a plate which has a breadth in the left-right direction and the front-rear direction and of which the thickness direction is parallel to the up-down direction as shown in FIG. 2. The upper surface of the placement part 30 has a breadth in the left-right direction and the front-rear direction and functions as a placement surface 35 on which the recording medium P is to be placed. A rear wall 32 is disposed on the rear side of the placement part 30.

Loading Part 40

As shown in FIG. 1, the loading part 40 is disposed on the lower side of the placement part 30 to have a space 44 between the loading part and the placement part 30. The recording medium P, which is discharged to the space 44 from the image forming apparatus body 11 in a predetermined discharge direction (hereinafter, referred to as a medium discharge direction), is loaded on the loading part 40. The medium discharge direction corresponds to a right side in this exemplary embodiment. Accordingly, a downstream side in the medium discharge direction is a right side and an upstream side in the medium discharge direction is a left side.

The loading part 40 is disposed on the upper side of the image forming apparatus body 11 (housing 11A). That is, the loading part 40 is disposed between the placement part 30 and the image forming apparatus body 11 (housing 11A).

The loading part 40 is formed of a plate which has a breadth in the left-right direction and the front-rear direction and of which the thickness direction is parallel to the up-down direction as shown in FIG. 2. The upper surface of the loading part 40 has a breadth in the left-right direction and the front-rear direction and functions as a loading surface 45 on which the recording medium P is to be loaded. The loading surface 45 includes an inclined surface 45A and a horizontal surface 45B.

The inclined surface 45A is an example of a first surface and has an upward gradient toward the downstream side in the medium discharge direction. That is, the inclined surface 45A is inclined obliquely upward to the right side.

The horizontal surface 45B is an example of a second surface and is disposed on the downstream side of the inclined surface 45A in the medium discharge direction. The horizontal surface 45B has an angle closer to a horizontal than the angle of the inclined surface 45A. In this exemplary embodiment, the horizontal surface 45B is formed of a horizontal surface extending in the horizontal direction.

In a case where convex portions, such as ribs, are formed on the loading surface 45, an imaginary surface connecting upper ends of the convex portions may be grasped as a loading surface.

A rear wall 42 is disposed on the loading part 40 on the rear side of the space 44. Further, an upstream wall 43 is disposed on the upstream side of the space 44 in the medium discharge direction (specifically, the left side). As described above, the space 44 is closed on the rear side and the upstream side in the medium discharge direction (specifically, the left side) and is open on the front side and the downstream side in the medium discharge direction (specifically, the right side). The space 44 is opened and closed on the downstream side in the medium discharge direction (specifically, the right side) by the opening/closing part 60 as described later. Accordingly, in this exemplary embodiment, the recording medium P loaded on the loading part 40 can be taken out from the downstream side in the medium discharge direction (specifically, the right side) in a state where the opening/closing part 60 is open. Further, the recording medium P loaded on the loading part 40 can be taken out from the front side.

Support Portion 50

Figure 3:
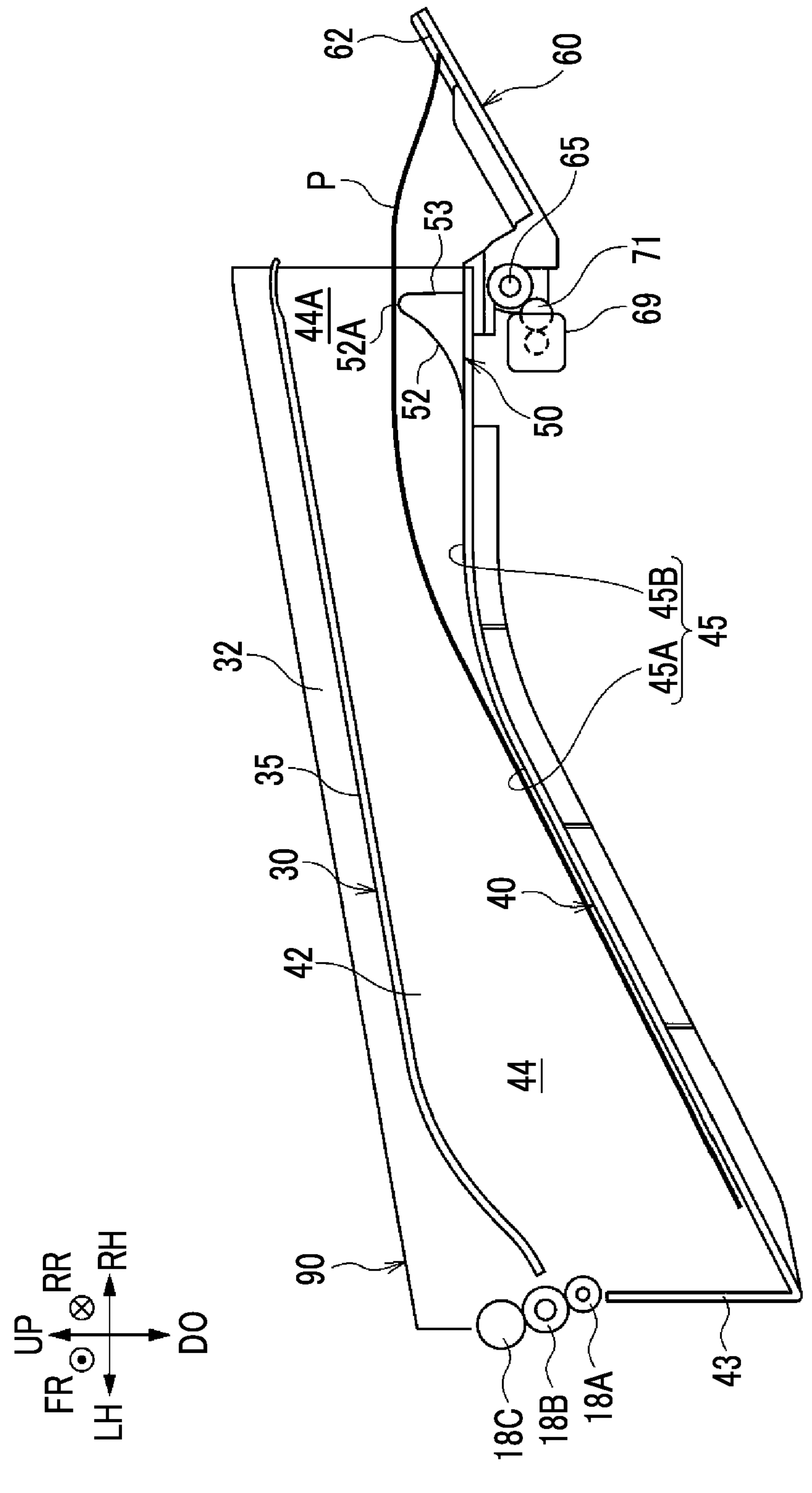
FIG. 3 is a schematic diagram showing a state where a recording medium is loaded in the discharge device according to this exemplary embodiment.

As shown in FIG. 2, the support portion 50 is provided on the loading part 40 to protrude toward the upper side of the loading part 40. The support portion 50 includes an inclined surface 52 having an upward gradient toward the downstream side in the medium discharge direction, and supports the recording medium P which is loaded on the loading part 40 at an upper end 52A of the inclined surface 52 as shown in FIG. 3. The inclined surface 52 functions as a guide surface that guides the recording medium P downstream in the medium discharge direction. The inclined surface 52 includes a curved surface which is formed in the shape of an arc concave toward the downstream side in the medium discharge direction in a cross-sectional view taken in a direction orthogonal to the medium discharge direction (specifically, the front-rear direction) and with which the recording medium P is in line contact.

Specifically, the support portion 50 is formed in a substantially triangular shape in the cross-sectional view. More specifically, the support portion 50 is formed substantially in the shape of a right triangle of which a hypotenuse corresponds to the inclined surface 52 and a short side corresponds to a downstream surface 53 facing the downstream side in the medium discharge direction.

Opening/Closing Part 60

As shown in FIG. 2, one end portion of the opening/closing part 60 is rotatably mounted on a downstream portion of the loading part 40 in the medium discharge direction. The opening/closing part 60 is rotated about a rotation axis parallel to the front-rear direction, so that the opening/closing part 60 is opened and closed to a closed position where the opening/closing part 60 closes a downstream portion 44A of the space 44 in the medium discharge direction (a position shown in FIG. 4) and an open position where the downstream portion 44A is open and a part of the recording medium P loaded on the loading part 40 is loaded on the opening/closing part 60 (a position shown in FIG. 2).

As shown in FIG. 3, the recording medium P loaded on the loading part 40 is loaded on the opening/closing part 60 in a state where the opening/closing part 60 is positioned at the open position. The inner surface (left surface) of the opening/closing part 60 serves as a loading surface 62 on which the recording medium P is to be loaded. A part (specifically, a downstream portion in the medium discharge direction) of the recording medium P loaded on the loading part 40 is loaded on the loading surface 62.

Drive Source 69 and Changing Unit 70

The drive source 69 and the changing unit 70 are an example of an angle changing unit. The drive source 69 drives the opening/closing part 60 to be opened and closed. In this exemplary embodiment, the drive source 69 is formed of, for example, a stepping motor of which the drive is controlled by pulse control. A driving force of the drive source 69 is transmitted to a shaft portion 65 of the opening/closing part 60 by a transmission mechanism 71 that includes mechanical elements, such as gears. The drive source 69 is rotated in a normal or a reverse direction by pulse control, which is performed by the changing unit 70, to cause the opening/closing part 60 to be opened or closed. The drive source 69 is not limited to a stepping motor, and various drive sources, such as other motors (for example, a DC motor, a servo motor, and the like) can be used.

The changing unit 70 is a component that changes the angle (specifically, an angle at the open position) of the opening/closing part 60 on the basis of a predetermined condition. Specifically, the changing unit 70 is formed of a control device that controls the drive of the drive source 69. The control device includes, for example, a processor and a storage that stores various programs, such as a control program, and various data. In the control device, the processor functions as the changing unit 70 by executing a control program.

The above-mentioned predetermined condition in which the angle of the opening/closing part 60 is changed includes the type of the recording medium P (specifically, whether or not the recording medium P is coated paper), the thickness of the recording medium P, the size of the recording medium P (specifically, the width (that is, a dimension in the front-rear direction) of the recording medium P), the environments of the image forming apparatus 10 (specifically, temperature, humidity, and the like), and the like.

For example, the changing unit 70 sets the angle of the opening/closing part 60 to a relatively large angle (an angle close to a vertical) in a case where the recording medium P is thick paper, and sets the angle of the opening/closing part 60 to a relatively small angle (an angle close to a horizontal) in a case where the recording medium P is thin paper.

Angles of loading surface 62 of opening/closing part 60 and inclined surface 52 of support portion 50

An angle θ1 (see FIG. 2) of the loading surface 62 of the opening/closing part 60 at the open position with respect to a horizontal is set to an angle at which the movement of the recording medium P to the downstream side in the medium discharge direction is limited such that the centroid of the longest recording medium P loaded on the loading part 40 and the loading surface 62 is positioned upstream of a downstream end of the opening/closing part 60 in the medium discharge direction.

The longest recording medium P is a recording medium P of which a dimension in a transport direction is maximum among recording mediums P on which the formation of images (transport) can be performed in the image forming apparatus 10. In this exemplary embodiment, for example, plain paper having an A3 size (420 mm) is the longest recording medium P. Plain paper is a sheet that has a basis weight of 50 $g/m^2$ or more and 100 $g/m^2$ or less without including a coat layer.

In this exemplary embodiment, the angle θ1 is set in a range of, for example, 0° or more and 90° or less and the movement of the recording medium P to the downstream side in the medium discharge direction is further limited as the angle θ1 gets closer to 90° from 0°.

Further, the angle θ1 of the loading surface 62 of the opening/closing part 60 at the open position is less than an angle that allows the longest recording medium P (specifically, for example, plain paper having an A3 size) to ride on the loading surface 62 at a position above the upper end 52A of the inclined surface 52 of the support portion 50. As the angle θ1 gets closer to 90° from 0°, the recording medium P is lifted to a higher position in a case where the recording medium P rides on the loading surface 62. Accordingly, the recording medium P is likely to be above the upper end 52A of the inclined surface 52 of the support portion 50.

More specifically, the angle θ1 is set to, for example, 20° or more in this exemplary embodiment. Further, the angle θ1 is set to 40° or less. That is, the angle θ1 is set to, for example, 20° or more and 40° or less in this exemplary embodiment.

An imaginary line 59 (see FIG. 2) extending to the upper end from an upstream end of the inclined surface 52 of the support portion 50 in the medium discharge direction is along the loading surface 62 of the opening/closing part 60 at the open position. "The imaginary line 59 is along the loading surface 62" includes not only a case where an angle θ2 of the imaginary line 59 with respect to a horizontal is the same angle as the angle θ1 of the loading surface 62 but also a case where the angle θ2 of the imaginary line 59 with respect to a horizontal has an angle difference in a range of ±5°.

Specifically, the angle θ2 of the imaginary line 59 with respect to a horizontal is set to, for example, 20° or more. Further, the angle θ2 is set to 40° or less. That is, the angle θ2 is set to, for example, 20° or more and 40° or less in this exemplary embodiment.

Position of Support Portion 50

The support portion 50 is disposed at a position on the downstream side of a start position 40S (see FIG. 2), where a distal end of the recording medium P discharged to the space 44 from the image forming apparatus body 11 starts to be in contact with the loading part 40, in the medium discharge direction.

Specifically, in a case where plain paper having the maximum size (specifically, for example, an A3 size) is discharged to the space 44 from the image forming apparatus body 11 as the recording medium P, the support portion 50 is disposed at a position on the downstream side of the start position 40S, where a distal end of the plain paper starts to be in contact with the loading part 40, in the medium discharge direction. In more detail, the support portion 50 is disposed at a position on the downstream side of the start position 40S, where distal ends of plain paper having all sizes on which the formation of images (transport) can be performed in the image forming apparatus 10 start to be in contact with loading part 40, in the medium discharge direction.

In other words, in this exemplary embodiment, the distal end of the recording medium P discharged to the space 44 from the image forming apparatus body 11 is in contact with not the support portion 50 but the loading surface 45 of the loading part 40 on the upstream side of the support portion 50 in the medium discharge direction for the first time.

Specifically, the support portion 50 is disposed at a position on the downstream side of a middle 40C (see FIG. 2) of the horizontal surface 45B of the loading part 40 in the medium discharge direction. That is, an upstream end of the support portion 50 in the medium discharge direction is disposed at a position on the downstream side of the middle 40C in the medium discharge direction. In FIG. 2, the range of the horizontal surface 45B of the loading part 40 is denoted by reference numeral 452.

Further, the support portion 50 is disposed at a position on the upstream side of a contact position between the support portion 50 and the opening/closing part 60 positioned at the closed position (the position shown in FIG. 4) in the medium discharge direction. In other words, the support portion 50 is disposed to have a gap between a downstream end of the support portion 50 in the medium discharge direction and the opening/closing part 60 positioned at the closed position (the position shown in FIG. 4).

Height of Support Portion 50

In a case where the distal end of the recording medium P discharged to the space 44 from the image forming apparatus body 11 is in contact with the inclined surface 52, a height 50H of the support portion 50 from the loading surface 45 (specifically, the horizontal surface 45B) of the loading part 40 (hereinafter, simply referred to as a height 50H) is set to be equal to or lower than a height that allows the distal end to ride on the upper end 52A of the inclined surface 52.

In a case where the recording medium P is discharged up to the position of the support portion 50 in a state where corrugation occurs on the recording medium P, the height 50H of the support portion 50 is set to be equal to or higher than a height that allows the distal end to be in contact with the inclined surface 52.

Figure 5:
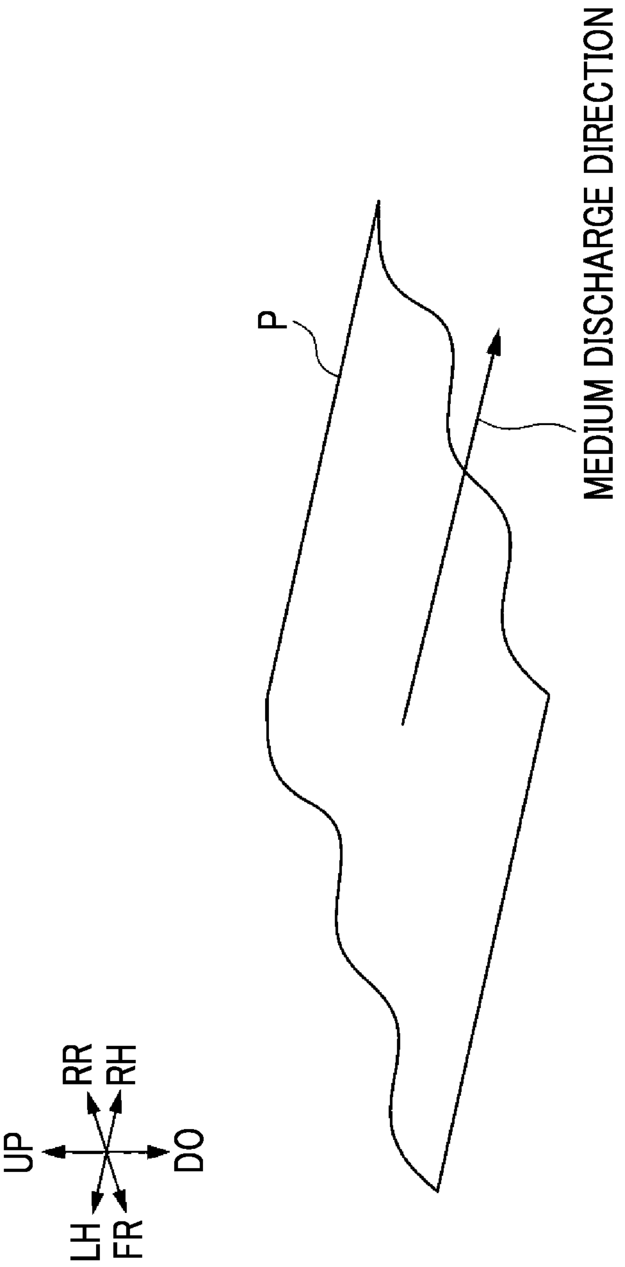
FIG. 5 is a perspective view showing a state where corrugations are formed on a recording medium.

The corrugation of the recording medium P means an attitude in which the recording medium P is undulated in the front-rear direction as shown in FIG. 5. The recording medium P on which corrugation occurs is discharged in the medium discharge direction in an attitude along the medium discharge direction without the distal end thereof hanging down.

The height 50H of the support portion 50 is set to, for example, 30 mm or less in this exemplary embodiment. Specifically, the height 50H of the support portion 50 is set to, for example, 15 mm or more and 30 mm or less.

Action of this Exemplary Embodiment

In this exemplary embodiment, the angle θ1 (see FIG. 2) of the loading surface 62 of the opening/closing part 60 at the open position with respect to a horizontal is set to an angle at which the movement of the recording medium P to the downstream side in the medium discharge direction is limited such that the centroid of the longest recording medium P loaded on the loading part 40 and the loading surface 62 is positioned upstream of a downstream end of the opening/closing part 60 in the medium discharge direction. Specifically, the angle θ1 is set to, for example, 20° or more in this exemplary embodiment.

Further, the imaginary line 59 (see FIG. 2) extending to the upper end from the upstream end of the inclined surface 52 of the support portion 50 in the medium discharge direction is along the loading surface 62 of the opening/closing part 60 at the open position.

Here, in a case where the imaginary line 59 is along a surface of which an angle with respect to a horizontal is smaller than the angle θ1 (hereinafter, referred to as a form A), the recording medium P is likely to get over the support portion 50 and a recording medium P already loaded on the support portion 50 is pushed by a subsequent discharged recording medium P in the medium discharge direction, so that the recording medium P is likely to move in the medium discharge direction. For this reason, the recording medium P is likely to fall from the opening/closing part 60.

On the other hand, since the imaginary line 59 (see FIG. 2) extending to the upper end from the upstream end of the inclined surface 52 of the support portion 50 in the medium discharge direction is along the loading surface 62 of the opening/closing part 60 at the open position in this exemplary embodiment, the falling of the recording medium P from the opening/closing part 60 is suppressed as compared to the form A. Accordingly, the falling of the recording medium P, which images are formed on, for example, both surfaces by the image forming unit 14, from the opening/closing part 60 is suppressed.

Further, in this exemplary embodiment, the angle θ1 of the loading surface 62 of the opening/closing part 60 at the open position is less than an angle that allows the longest recording medium P (specifically, for example, plain paper having an A3 size) to ride on the loading surface 62 at a position above the upper end 52A of the inclined surface 52 of the support portion 50.

For this reason, it is difficult for the recording medium P to be above the upper end 52A of the support portion 50 as compared to a case where the angle θ1 is equal to or larger than the angle that allows the longest recording medium P to ride on the loading surface 62 at a position above the upper end 52A of the inclined surface 52 of the support portion 50. As a result, the poor loading of the recording medium P is suppressed.

Specifically, the angle θ1 is set to, for example, 20° or more and 40° or less in this exemplary embodiment. In a case where the angle θ1 is less than 20°, the recording medium P is likely to move downstream in the medium discharge direction on the loading surface 62 of the opening/closing part 60 and is likely to fall from the opening/closing part 60. Further, in a case where the angle θ1 exceeds 40°, the recording medium P is likely to ride on the loading surface 62 of the opening/closing part 60 and be away from the upper end 52A of the support portion 50 and the recording medium P may collide with the upper end 52A of the loading surface 62 and be damaged.

Therefore, according to the configuration of this exemplary embodiment, the falling of the recording medium P from the opening/closing part 60 and the poor loading of the recording medium P are suppressed as compared to a case where the angle θ1 is outside a range of 20° or more and 40° or less.

Further, more specifically, the angle θ2 is set to, for example, 20° or more and 40° or less in addition to the angle θ1 in this exemplary embodiment.

In a case where the angle θ2 is less than 20°, the recording medium P is likely to get over the support portion 50 and a recording medium P already loaded on the support portion 50 is pushed by a subsequent discharged recording medium P in the medium discharge direction, so that the recording medium P is likely to move in the medium discharge direction. For this reason, the recording medium P is likely to fall from the opening/closing part 60. Further, in a case where the angle θ2 exceeds 40°, the recording medium P is likely not to be placed on and supported by the upper end 52A of the inclined surface 52 of the support portion 50 and the recording medium P may collide with the inclined surface 52 and be damaged.

Therefore, according to the configuration of this exemplary embodiment, the falling of the recording medium P from the opening/closing part 60 and the poor loading of the recording medium P are suppressed as compared to a case where the angle θ2 is outside a range of 20° or more and 40° or less.

Further, in this exemplary embodiment, the support portion 50 is disposed at a position on the downstream side of the start position 40S (see FIG. 2), where the distal end of the recording medium P discharged to the space 44 from the image forming apparatus body 11 starts to be in contact with the loading part 40, in the medium discharge direction.

Here, in a case where the support portion 50 is disposed at a position on the upstream side of the start position 40S (see FIG. 2) in the medium discharge direction (hereinafter, referred to as a form B), the distal end of the recording medium P discharged to the space 44 from the image forming apparatus body 11 may directly collide with the support portion 50 and the transport resistance of the recording medium P may be generated or the recording medium P may be damaged.

On the other hand, in this exemplary embodiment, as described above, the support portion 50 is disposed at a position on the downstream side of the start position 40S (see FIG. 2), where the distal end of the recording medium P discharged to the space 44 from the image forming apparatus body 11 starts to be in contact with the loading part 40, in the medium discharge direction. Accordingly, the poor loading of the recording medium P is suppressed as compared to the form B.

Further, in this exemplary embodiment, specifically, the support portion 50 is disposed at a position on the downstream side of the middle 40C (see FIG. 2) of the horizontal surface 45B of the loading part 40 in the medium discharge direction.

Here, in a case where the support portion 50 is disposed at a position on the upstream side of the middle 40C (see FIG. 2) in the medium discharge direction (hereinafter, referred to as a form C), the distal end of the recording medium P discharged to the space 44 from the image forming apparatus body 11 may directly collide with the support portion 50 and the transport resistance of the recording medium P may be generated or the recording medium P may be damaged.

On the other hand, in this exemplary embodiment, the support portion 50 is disposed at a position on the downstream side of the middle 40C (see FIG. 2) of the horizontal surface 45B of the loading part 40 in the medium discharge direction. Accordingly, the poor loading of the recording medium P is suppressed as compared to the form C.

Further, in this exemplary embodiment, the support portion 50 is disposed at a position on the upstream side of a contact position between the support portion 50 and the opening/closing part 60 positioned at the closed position (the position shown in FIG. 4) in the medium discharge direction.

Figure 4:
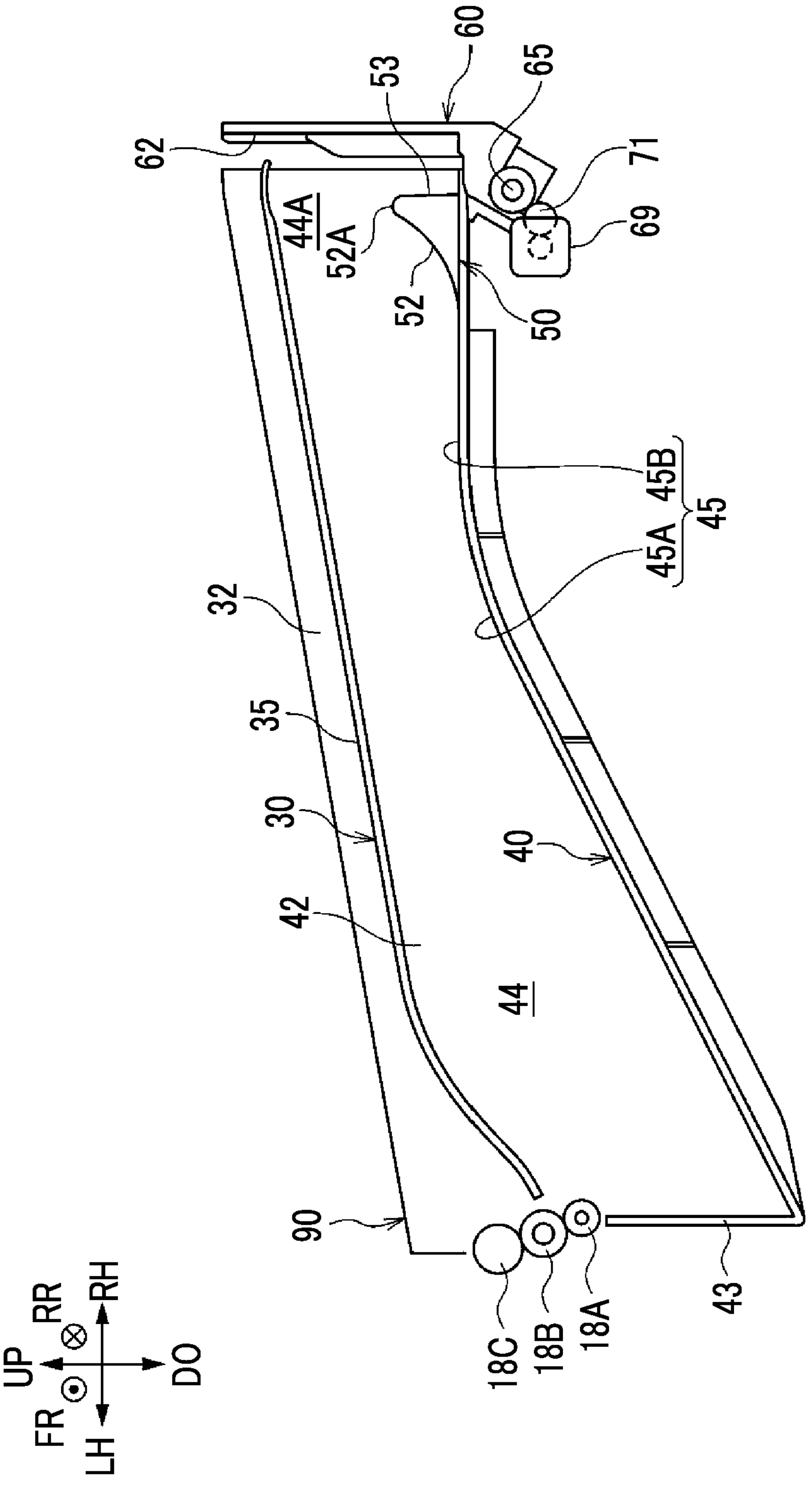
FIG. 4 is a schematic diagram showing a state where an opening/closing part is closed in the discharge device according to this exemplary embodiment.

For this reason, the interference of the support portion 50 with the opening/closing part 60 is suppressed as compared to a case where the support portion 50 is positioned at a contact position between the support portion 50 and the opening/closing part 60 positioned at the closed position (the position shown in FIG. 4).

Further, in this exemplary embodiment, in a case where the distal end of the recording medium P discharged to the space 44 from the image forming apparatus body 11 is in contact with the inclined surface 52, the height 50H of the support portion 50 from the loading surface 45 (specifically, the horizontal surface 45B) of the loading part 40 (hereinafter, simply referred to as the height 50H) is set to be equal to or lower than a height that allows the distal end to ride on the upper end 52A of the inclined surface 52.

For this reason, the recording medium P is likely to be supported by the upper end 52A of the inclined surface 52 and the poor loading of the recording medium P is suppressed as compared to a case where the height 50H of the support portion 50 exceeds a height that allows the distal end of the recording medium P to ride on the upper end 52A of the inclined surface 52 in a case where the distal end of the recording medium P discharged to the space 44 from the image forming apparatus body 11 is in contact with the inclined surface 52.

Further, in this exemplary embodiment, in a case where the recording medium P is discharged up to the position of the support portion 50 in a state where corrugation occurs on the recording medium P, the height 50H of the support portion 50 is set to be equal to or higher than a height that allows the distal end to be in contact with the inclined surface 52.

For this reason, the corrugation of the recording medium P is eliminated and the movement of the recording medium P to the downstream side in the medium discharge direction more than necessary is limited as compared to a case where the height 50H of the support portion 50 is set to be less than a height that allows the distal end of the recording medium P to be in contact with the inclined surface 52 in a case where the recording medium P is discharged up to the position of the support portion 50 in a state where corrugation occurs on the recording medium P. As a result, the falling of the recording medium P from the opening/closing part 60 is suppressed.

Specifically, the height 50H of the support portion 50 is set to, for example, 30 mm or less in this exemplary embodiment. In a case where the height 50H exceeds 30 mm, the recording medium P is likely not to be placed on and supported by the upper end 52A of the inclined surface 52 of the support portion 50 and the recording medium P may collide with the inclined surface 52 and be damaged.

Therefore, according to the configuration of this exemplary embodiment, the poor loading of the recording medium P is suppressed as compared to a case where the height 50H exceeds 30 mm.

More specifically, the height 50H of the support portion 50 is set to, for example, 15 mm or more and 30 mm or less. In a case where the height 50H is less than 15 mm, the recording medium P is likely to get over the support portion 50 and a recording medium P already loaded on the support portion 50 is pushed by a subsequent discharged recording medium P in the medium discharge direction, so that the recording medium P is likely to move in the medium discharge direction. For this reason, the recording medium P is likely to fall from the opening/closing part 60.

Therefore, according to the configuration of this exemplary embodiment, the falling of the recording medium P from the opening/closing part 60 and the poor loading of the recording medium P are suppressed as compared to a case where the height 50H of the support portion 50 is outside a range of 15 mm or more and 30 mm or less.

Further, in this exemplary embodiment, the angle of the opening/closing part 60 can be adjusted by the drive source 69 and the changing unit 70. For this reason, the angle of the opening/closing part 60 is changed depending on the type of the recording medium P, so that general-purpose properties for the type of the recording medium P can be ensured.

Furthermore, the changing unit 70 changes the angle of the opening/closing part 60 on the basis of the predetermined condition in this exemplary embodiment. For this reason, the angle of the opening/closing part 60 can be changed depending on the type of the recording medium P (specifically, whether or not the recording medium P is coated paper), the thickness of the recording medium P, the size of the recording medium P (specifically, the width (that is, a dimension in the front-rear direction) of the recording medium P), the environments of the image forming apparatus 10 (specifically, temperature, humidity, and the like), and the like. Accordingly, the falling of the recording medium P from the opening/closing part 60 and the poor loading of the recording medium P are suppressed as compared to a case where the angle of the opening/closing part 60 is constant.

Modification Example of Discharge Device 90

The angle θ1 of the opening/closing part 60 is less than an angle that allows the longest recording medium P to ride on the loading surface 62 at a position above the upper end 52A of the inclined surface 52 of the support portion 50 in this exemplary embodiment, but is not limited thereto. For example, the angle θ1 may be equal to or larger than the angle that allows the longest recording medium P to ride on the loading surface 62 at a position above the upper end 52A of the inclined surface 52 of the support portion 50.

Further, the angle θ1 is set to, for example, 20° or more and 40° or less in this exemplary embodiment, but is not limited thereto. For example, the angle θ1 may be outside a range of 20° or more and 40° or less.

Furthermore, the angle θ2 is set to, for example, 20° or more and 40° or less in addition to the angle θ1 in this exemplary embodiment, but is not limited thereto. The angle θ2 may be outside a range of 20° or more and 40° or less.

Further, the support portion 50 is disposed at a position on the downstream side of the start position 40S (see FIG. 2), where the distal end of the recording medium P discharged to the space 44 from the image forming apparatus body 11 starts to be in contact with the loading part 40, in the medium discharge direction in this exemplary embodiment, but is not limited thereto. For example, the support portion 50 may be disposed at a position on the upstream side of the start position 40S (see FIG. 2) in the medium discharge direction.

Furthermore, the support portion 50 is disposed at a position on the downstream side of the middle 40C (see FIG. 2) of the horizontal surface 45B of the loading part 40 in the medium discharge direction in this exemplary embodiment, but is not limited thereto. For example, the support portion 50 maybe disposed at a position on the upstream side of the middle 40C (see FIG. 2) in the medium discharge direction.

Further, the support portion 50 is disposed at a position on the upstream side of a contact position between the support portion 50 and the opening/closing part 60 positioned at the closed position (the position shown in FIG. 4) in the medium discharge direction in this exemplary embodiment, but is not limited thereto. For example, the support portion 50 may be disposed at a contact position between the support portion 50 and the opening/closing part 60 positioned at the closed position (the position shown in FIG. 4).

Furthermore, in this exemplary embodiment, in a case where the distal end of the recording medium P discharged to the space 44 from the image forming apparatus body 11 is in contact with the inclined surface 52, the height 50H of the support portion 50 from the loading surface 45 (specifically, the horizontal surface 45B) of the loading part 40 (hereinafter, simply referred to as the height 50H) is set to be equal to or lower than a height that allows the distal end to ride on the upper end 52A of the inclined surface 52. However, the height 50H is not limited thereto. For example, the height 50H of the support portion 50 may exceed the height that allows the distal end of the recording medium P to ride on the upper end 52A of the inclined surface 52 in a case where the distal end of the recording medium P discharged to the space 44 from the image forming apparatus body 11 is in contact with the inclined surface 52.

Further, in this exemplary embodiment, in a case where the recording medium P is discharged up to the position of the support portion 50 in a state where corrugation occurs on the recording medium P, the height 50H of the support portion 50 is set to be equal to or higher than a height that allows the distal end to be in contact with the inclined surface 52. However, the height 50H is not limited thereto. For example, the height 50H of the support portion 50 may be less than a height that allows the distal end of the recording medium P to be in contact with the inclined surface 52 in a case where the recording medium P is discharged up to the position of the support portion 50 in a state where corrugation occurs on the recording medium P.

Further, the height 50H of the support portion 50 is set to, for example, 15 mm or more and 30 mm or less in this exemplary embodiment, but is not limited thereto. For example, the height 50H of the support portion 50 may be outside a range of 15 mm or more and 30 mm or less.

Furthermore, the changing unit 70 is adapted to change the angle of the opening/closing part 60 on the basis of predetermined condition in this exemplary embodiment, but is not limited thereto. For example, the angle of the opening/closing part 60 may be constant.

Further, the drive source 69 and the changing unit 70 are used as an example of an angle changing unit in this exemplary embodiment, but the angle changing unit is not limited thereto. For example, a mechanism that is adapted to allow the angle of the opening/closing part 60 to be manually changed and includes a holding unit for holding the opening/closing part 60, of which an angle is changed, at the changed angle may be used as the angle changing unit. Examples of the mechanism include a hinge with a stopper, and the like.

Modification Example of Image Forming Unit 14

An example of the image forming unit is not limited to the image forming unit 14 described above. For example, a direct transfer system in which each of the toner image forming units 20Y to 20K directly forms a toner image on a recording medium P without the transfer body 24 may be used as an example of the image forming unit. Further, an example of the image forming unit may be an image forming unit for forming an image by jetting ink to a recording medium P, and has only to have a function to form an image on a recording medium P.

The present invention is not limited to the above-mentioned exemplary embodiment and may include various modifications, alterations, or improvements without departing from the scope of the present invention. For example, a plurality of modification examples among the above-mentioned modification examples may be appropriately combined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A discharge device comprising:

a placement part on which a medium discharged from an apparatus body is placed and from which the medium is returned to the apparatus body;

a loading part which is disposed on a lower side of the placement part to have a space between the loading part and the placement part and on which the medium discharged to the space from the apparatus body in a predetermined discharge direction is loaded;

a support portion that is provided on the loading part to protrude toward an upper side of the loading part, includes an inclined surface having an upward gradient toward a downstream side in the discharge direction, and supports the medium which is loaded on the loading part at an upper end of the inclined surface;

an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part, wherein an angle of a loading surface of the opening/closing part at the open position with respect to a horizontal is set to an angle at which a movement of the medium to the downstream side in the discharge direction is limited such that a centroid of a longest medium loaded on the loading part and the loading surface is positioned upstream of a downstream end of the opening/closing part in the discharge direction, and an imaginary line extending to the upper end from an upstream end of the inclined surface of the support portion in the discharge direction is along the loading surface of the opening/closing part at the open position; and a control device comprising a processor configured to electrically control the angle of the loading surface of the opening/closing part.

2. A discharge device comprising:

a placement part on which a medium discharged from an apparatus body is placed and from which the medium is returned to the apparatus body;

a loading part which is disposed on a lower side of the placement part to have a space between the loading part and the placement part and on which the medium discharged to the space from the apparatus body in a predetermined discharge direction is loaded;

a support portion that is provided on the loading part to protrude toward an upper side of the loading part, includes an inclined surface having an upward gradient toward a downstream side in the discharge direction, and supports the medium which is loaded on the loading part at an upper end of the inclined surface;

an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part, wherein an angle of a loading surface of the opening/closing part at the open position with respect to a horizontal is set to 20° or more, and an imaginary line extending to the upper end from an upstream end of the inclined surface of the support portion in the discharge direction is along the loading surface of the opening/closing part at the open position; and a control device comprising a processor configured to electrically control the angle of the loading surface of the opening/closing part.

3. A discharge device comprising:

a placement part on which a medium discharged from an apparatus body is placed and from which the medium is returned to the apparatus body;

a loading part which is disposed on a lower side of the placement part to have a space between the loading part and the placement part and on which the medium discharged to the space from the apparatus body in a predetermined discharge direction is loaded;

a support portion that is provided on the loading part to protrude toward an upper side of the loading part, includes an inclined surface having an upward gradient toward a downstream side in the discharge direction, and supports the medium which is loaded on the loading part at an upper end of the inclined surface;

an opening/closing part of which one end is rotatably mounted on a downstream portion of the loading part in the discharge direction and is opened and closed to a closed position where the opening/closing part closes a downstream portion of the space in the discharge direction and an open position where the downstream portion is open and a part of the medium loaded on the loading part is loaded on the opening/closing part;

an angle changing unit that changes an angle of the opening/closing part; and a control device comprising a processor configured to electrically control the angle of a loading surface of the opening/closing part.

4. The discharge device according to claim 1, wherein the angle of the loading surface of the opening/closing part at the open position with respect to the horizontal is less than an angle that allows the longest medium to ride on the loading surface at a position above the upper end.

5. The discharge device according to claim 2, wherein the angle of the loading surface of the opening/closing part at the open position with respect to the horizontal is less than an angle that allows the longest medium to ride on the loading surface at a position above the upper end.

6. The discharge device according to claim 3, wherein the angle of the loading surface of the opening/closing part at the open position with respect to the horizontal is less than an angle that allows the longest medium to ride on the loading surface at a position above the upper end.

7. The discharge device according to claim 1, wherein the angle of the loading surface of the opening/closing part at the open position with respect to the horizontal is set to 20° or more and 40° or less.

8. The discharge device according to claim 2, wherein the angle of the loading surface of the opening/closing part at the open position with respect to the horizontal is set to 20° or more and 40° or less.

9. The discharge device according to claim 3, wherein the angle of the loading surface of the opening/closing part at the open position with respect to the horizontal is set to 20° or more and 40° or less.

10. The discharge device according to claim 7, wherein angles of the loading surface of the opening/closing part at the open position and the imaginary line with respect to the horizontal are set to 20° or more and 40° or less.

11. The discharge device according to claim 8, wherein angles of the loading surface of the opening/closing part at the open position and the imaginary line with respect to the horizontal are set to 20° or more and 40° or less.

12. The discharge device according to claim 1, wherein the support portion is disposed at a position on a downstream side of a position, where a distal end of the medium discharged to the space from the apparatus body starts to be in contact with the loading part, in the discharge direction.

13. The discharge device according to claim 1, wherein a loading surface of the loading part includes a first surface that has an upward gradient toward the downstream side in the discharge direction and a second surface that is disposed on a downstream side of the first surface in the discharge direction and has an angle closer to the horizontal than an angle of the inclined surface, and the support portion is disposed at a position on a downstream side of a middle of the second surface in the discharge direction.

14. The discharge device according to claim 12, wherein the support portion is disposed at a position on an upstream side of a contact position between the support portion and the opening/closing part positioned at the closed position in the discharge direction.

15. The discharge device according to claim 1, wherein in a case where a distal end of the medium discharged to the space from the apparatus body is in contact with the inclined surface, a height of the support portion from a loading surface of the loading part is set to be equal to or lower than a height that allows the distal end to ride on the upper end of the inclined surface.

16. The discharge device according to claim 15, wherein in a case where the distal end of the medium is discharged up to a position of the support portion in a state where corrugation occurs on the medium, the height of the support portion from the loading surface of the loading part is set to be equal to or higher than a height that allows the distal end to be in contact with the inclined surface.

17. The discharge device according to claim 1, wherein a height of the support portion from a loading surface of the loading part is set to 30 mm or less.

18. The discharge device according to claim 17, wherein the height of the support portion from the loading surface of the loading part is set to 15 mm or more and 30 mm or less.

19. The discharge device according to claim 1, further comprising:

a drive source that drives the opening/closing part to be opened and closed; and a changing unit that changes the angle of the opening/closing part on the basis of a predetermined condition.

20. An image forming apparatus comprising:

an image forming unit that is provided in the apparatus body and forms an image on the medium; and the discharge device according to claim 1 in which a medium on which an image is formed on one surface by the image forming unit is placed on the placement part and is inverted and a medium on which images are formed on both surfaces is loaded on the loading part.

* * * * *